March 11, 1952  M. E. GILBERT  2,589,073
COOKING STOVE
Filed Aug. 22, 1947  2 SHEETS—SHEET 1
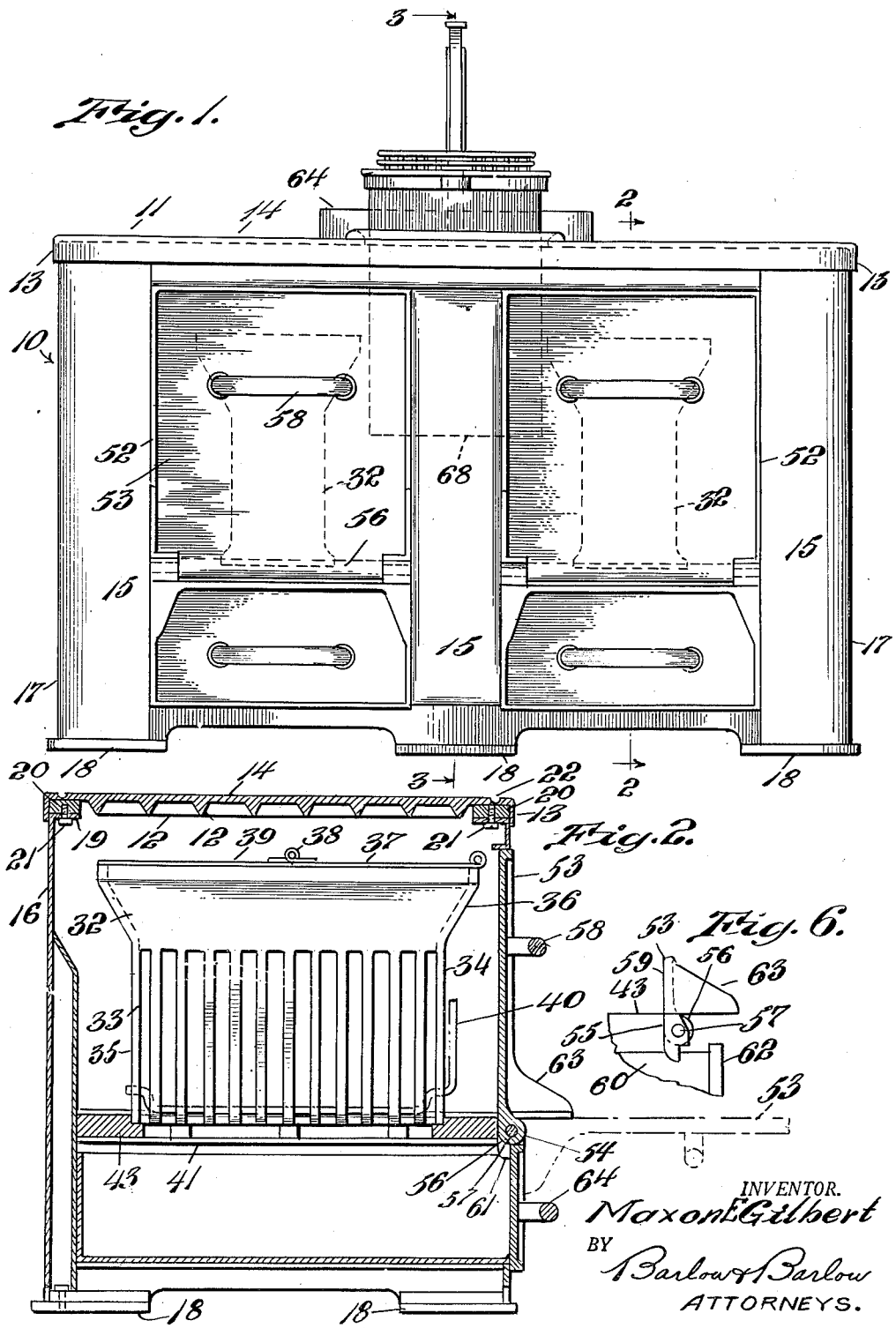

March 11, 1952     M. E. GILBERT     2,589,073
COOKING STOVE
Filed Aug. 22, 1947                                                  2 SHEETS—SHEET 2
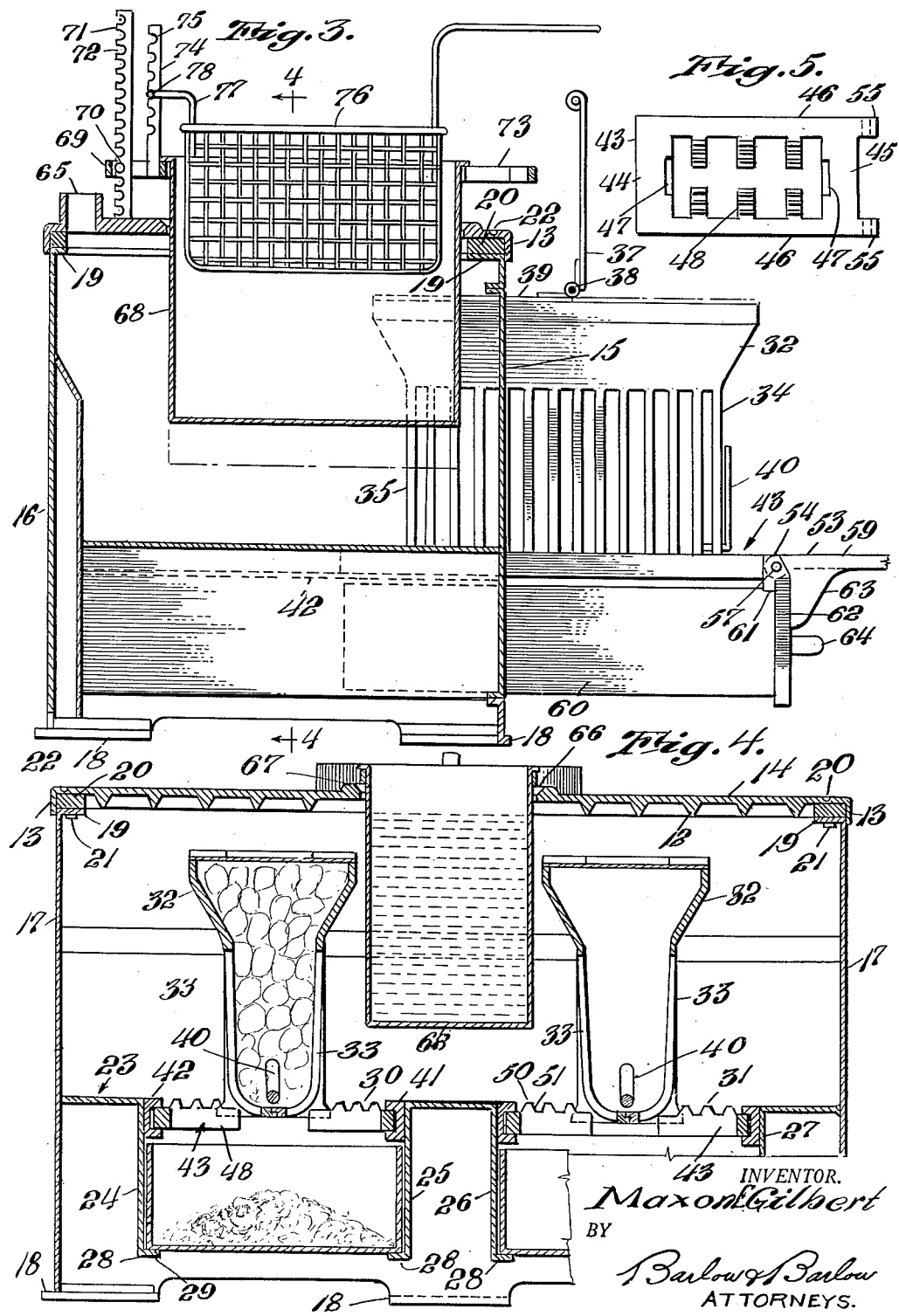
INVENTOR.
Maxon E. Gilbert
BY
Barlow & Barlow
ATTORNEYS.

Patented Mar. 11, 1952

2,589,073

UNITED STATES PATENT OFFICE 2,589,073

COOKING STOVE

Maxon E. Gilbert, North Scituate, R. I.

Application August 22, 1947, Serial No. 770,136

5 Claims. (Cl. 126—2)

This invention relates to a cooking stove and contemplates an improvement on the construction shown and described in my Patent No. 2,375,913, granted May 15, 1945.

An object of the present invention is to provide novel and improved means for slidably supporting the fire box beneath a grill plate of the stove.

Another object of this invention is to provide a construction whereby the fire box and ash drawer may be moved from beneath the grill plate as a unit and the drawer may also be moved independently of the fire box.

Another object of this invention is the provision of a closure for the chamber in which the fire box is mounted which may be employed for a work bench when in the open position.

With these and other objects in view, the invention consists of certain novel features of construction as will be more fully described and particularly pointed out in the appended claims.

In the accompanying drawings:

Fig. 1 is a front elevational view of a cooking stove embodying my invention;

Fig. 2 is an elevational view taken transversely through the stove substantially along line 2—2 of Fig. 1;

Fig. 3 is a sectional view also taken transversely through the stove substantially along line 3—3 of Fig. 1;

Fig. 4 is a longitudinal sectional view taken substantially along line 4—4 of Fig. 3 but with the fire boxes and ash drawer extending fully within the stove chamber;

Fig. 5 is a plan view of the support on which the fire boxes are mounted;

Fig. 6 is a fragmental elevational view of the mounting of the closure of the stove.

In general, the construction of the stove in the present invention provides a chamber, the top wall of which forms a grill plate on which food may be processed in a usual manner. In this chamber, there are a plurality of pairs of spaced guides each of which slidably receives a support on which is detachably mounted a fuel basket or charcoal fire box. Each support is individually movable into and out of the chamber to position individual fire boxes at a location to be recharged or for purposes of controlling the burning of the fuel and heat transmitted to the grill plate. Beneath each support there is slidably mounted an ash drawer for receiving ashes dropped from the fire box and drippings from any food being cooked at the sides of the fire box.

In order that the ash drawer may be in a position to receive the ashes and food drippings at all positions of the fire box relative to the grill plate, I provide a construction whereby the ash drawer will normally be moved as a unit with the fire box support. The construction also provides for the ash drawer to be moved independently of the support for the purpose of emptying the same.

In the grill plate an opening is provided between two fire boxes. In the particular disclosure, there are but two fire boxes shown and a single opening is provided therebetween. In this opening a vessel for containing a frying medium, such as fat, is suspended in such a manner that the same may be moved vertically to and from the fire boxes so as to control the temperature of the frying medium. This vessel may be used for frying chicken, potatoes, fish and the like.

Referring to the drawings for a more detailed description of the invention, 10 designates generally a cooking stove having a top wall 11 which is reinforced on the under surface thereof by means of a plurality of V-shaped ribs 12 intersecting each other in the manner of a grill (see Figs. 2 and 4). The top wall 11 extends substantially the full length and width of the stove and is provided with side flanges 13. The top wall 11 provides a grill plate 14 which is used to process food and for other similar purposes in the usual and well known manner.

The grill plate 14 is supported on the front, rear and side walls 15, 16 and 17, respectively. The lower edges of these walls are provided with foot portions 18. The upper edge portions of the walls are turned inwardly at right angles as at 19. On these turned in portions there rest plates 20. These plates extend lengthwise and widthwise of the stove and are secured in place by means of bolts 21 which extend through the turned in portions 19 and are threadedly received in the plates 20. The grill 14 rests upon these plates 20 with the flanges 13 extending into snug engagement with the side edges of the plates 20 and walls of the stove and may be there secured in position in any approved manner such for example as by welding. The grill plate is also provided with a so-called grease groove 22 for a purpose well known in stoves of this type.

The chamber formed by the outer walls of the stove is divided into upper and lower compartments by means of a partition designated generally 23. This partition has depending spaced walls 24, 25, 26 and 27 which are substantially similar to each other and extend generally parallel to each other with the lower end portions 28 thereof turned at a right angle as at 29. These walls provide, in the instant disclosure, two spaced openings 30 and 31 which extend widthwise of the stove. The lower end portion 28 of the walls 24 and 25 extend toward each other and provide spaced parallel guides for a purpose to be hereinafter described. The lower end portions 28 of the walls 26 and 27 extend toward each other in a like manner.

In the upper compartment fire boxes 32 are mounted with the top thereof sufficiently close to the bottom of the grill plate to subject the same to direct action of the burning fuel to be heated thereby. Each fire box 32 is of a similar construction and designed to burn charcoal in briquette form although other fuels may be found satisfactory. Each box 32 is in the form of a basket which is open at the top and having grated sides 33 and a bottom wall connected by solid end walls 34 and 35. The upper edges of the side walls of the fire box are flared outwardly as at 36. A closure 37 is hingedly secured as at 38 to a plate 39 fastened to the upper edges of the fire box. In order to control the depth of the fire, each fire box is provided with a shaker 40 which, in the present instant, is in the form of a crank pivotally mounted in the end walls 34 and 35 and operable to loosen and permit the escape of ashes through the openings in the sides of the fire box.

In the operation of the stove, it is desirable at times that the fire box may be moved outwardly of the chamber for cooking purposes or for controlling the temperature of the grill plate as well as for recharging the fire box. To this end, I provide pairs of spaced parallelly extending channels 41 and 42. These are secured to the walls 24, 25, 26 and 27 at the upper edges thereof. Each pair of channels provides spaced parallel guides in which there is slidably mounted a fire box support designated generally 43. This support, best shown in Fig. 5, is of a rectangular formation having an open center providing spaced end walls 44 and 45 and spaced side walls 46. The spaced end walls are recessed as at 47 and receive therein the lower edge portion of the front and rear walls 34 and 35 of the fire box. There extends inwardly from the side walls 46 a plurality of arms 48. The arms on one wall 46 extends in line with the arms 48 on the opposite wall. These arms are provided with raised abutments 50 providing recesses 51 in which may be supported the holders used for cooking various foods, these holders being placed in these recesses 51 and inclined to rest against the sides of the fire box to subject the food held therein to the direct action of the live coals.

The front wall 15 of the stove is provided with openings 52 through which the fire box supports are moved in and out of the upper chamber. These openings are each provided with a closure 53 which is hingedly related to the support 43 by means of a hinge joint 54. This hinge joint comprises ears 55 projecting outwardly from the end 45 of the support and an ear 56 formed at the lower portion of the closure 53. A pivot pin 57 extends through the ears 55 and ear 56 to hingedly connect the closure 53 to the support 43. When the stove is not in use these closures may be moved to close the chamber by means of handle 58. When the stove is in use the closure will be in the open position and the inner side 59 thereof will provide a shelf for supporting food to be processed or already processed or for other purposes. An ash drawer 60 is provided for receiving the ashes and drippings. This drawer is slidably mounted on the turned in portions 28 previously described.

In order that the drawer may be moved in a position to receive ashes and drippings at all positions of the fire boxes, each ear 55 is provided with a depending lug 61 that extends beyond the upper edge portions of the front wall 62 of the ash drawer. These lugs provide a stop which limits the inward movement of the drawers 60. The closure 53 is provided with extensions 63 at the lower side edges thereof and which extends at right angles thereto. When a closure is in the open position, the extensions will be spaced from the lugs 61 a distance sufficient to receive therebetween the upper portion of the wall 62 and thereby lock the drawer in position to be moved with the support 43 as a unit. When the closure 53 is in the closed position, the drawer may be withdrawn from the stove to empty the same. For convenience, the drawers are provided with handles 64.

The heat generated in the upper chamber may be conducted and allowed to escape outwardly by means of a flue 65 opening through the rear portion of the grill plate 14. The passing or escaping of heat through the flue 65 may be controlled if desired by any suitable device (not shown).

In the grill plate 14 there is provided an opening 66. This opening is positioned between two fire boxes and a collar 67 extends thereabout. Suspended in this opening is a pot or vessel 68 in which is contained the fat or oil used for frying purposes. In order to control the temperature of the frying fat or oil, the vessel 68 is manually movable vertically and suspended in a chosen position by means of an arm 69 which extends rearwardly from the vessel and is provided with a pin or like projection 70. A post 71 extends upwardly from the grill 14 and is provided with a plurality of spaced recesses 72 in which is received the pin 70. The vessel is also provided with a handle 73 for convenience in raising or lowering the same as the case may be. The arm 69 is also provided with a post 74 which is similar to the post 71 and this post 74 is also provided with recesses 75. This post is used for purposes of suspending a cooking basket 76 which has an arm 77 extending therefrom and bent so as to provide a hooked portion 78 to engage into any of the recesses 75 for suspending the basket at the desired depth in the frying oils or outwardly thereof for draining purposes after the food has been cooked.

By means of this construction, it will be apparent that the vessel 68 may be lowered or raised to a proper position so as to maintain the frying oils at the desired temperature. When but a single fire box is in operation, the vessel 68 may be lowered to rest against the edge about an opening 66.

I claim:

1. A cooking stove having top, side, front and rear walls providing a chamber, said front wall having an opening therein, said top wall providing a grill plate, a plurality of spaced guides in said chamber beneath said grill plate, a fire box, a support for said fire box slidably mounted on said guides for movement in and out of said chamber through said opening, an ash drawer slidably mounted beneath said support, a stop on said support for engagement by said drawer, and a closure for said opening hinged to said support and movable therewith, said closure having a portion thereof engaging said drawer and with said stop moving said drawer with said support when moving the same out of said chamber.

2. A cooking stove comprising a grill plate, pairs of parallel spaced stationary guides beneath said grill plate with one pair of guides positioned above the other pair, a fire box, a support for said fire box slidably mounted on the upper pair of guides and movable to and from beneath said grill plate for fueling said fire box, said support having an open center and oppositely disposed recesses therein for receiving said fire box for detachably mounting the same on said support, an ash drawer slidably mounted beneath said support on the other pair of guides and means movably attached to said support and movable into engagement with said drawer for detachably securing said drawer to said support for moving the drawer with said support.

3. A cooking stove comprising a grill plate, pairs of parallel spaced stationary guides beneath said grill plate with one pair thereof positioned one above the other, a fire box, a support for said fire box slidably mounted on the upper pair of said guides and movable thereon to and from beneath said grill plate for fueling said fire box, said support having an open center and oppositely disposed recesses for receiving said fire box for detachably mounting the same on said support, an ash drawer slidably mounted beneath said support on the other pair of guides and means movably attached to said support and movable into engagement with said drawer for moving the same with said support and movable out of engagement with said drawer whereby said drawer may be moved from beneath said support independently of said support.

4. A cooking stove having top, side, front, and rear walls, said front wall having an opening therein, said top wall providing a grill plate, a pair of parallel spaced stationary guides in said chamber beneath said grill plate, a fire box, a support for said fire box slidably mounted on said guides and movable thereon in and out of said chamber through said opening for fueling said fire box, said support having spaced ears at the front end thereof, and a closure for said opening hinged to said ears and movable with said support when slidably moving said fire box out of said chamber.

5. A cooking stove having top, side, front, and rear walls, said front wall having an opening therein, said top wall providing a grill plate, a pair of parallel spaced stationary guides in said chamber beneath said grill plate, a fire box having side walls with openings therein and end walls extending beyond said side walls at the lower portion thereof, a support for said fire box slidably mounted on said guides and movable in and out of said chamber through said opening, said support having oppositely disposed recesses for receiving said end walls for detachably mounting said fire box on said support and provided with spaced ears at the front end thereof, and a closure for said opening hinged to said ears and movable with said support.

MAXON E. GILBERT.

REFERENCES CITED

The following references are of record in the file of this patent:

UNITED STATES PATENTS

| Number | Name | Date |
|---|---|---|
| 7,345 | Hyde | May 7, 1850 |
| 59,351 | Broadmeadow | Nov. 6, 1866 |
| 574,334 | Kennedy | Dec. 29, 1896 |
| 615,548 | Guinean | Dec. 6, 1898 |
| 1,000,716 | Clark | Aug. 15, 1911 |
| 1,656,181 | Elbert | Jan. 17, 1928 |
| 2,095,745 | Hiatt | Oct. 12, 1937 |
| 2,348,366 | Saviskas | May 9, 1944 |
| 2,375,913 | Gilbert | May 15, 1945 |

FOREIGN PATENTS

| Number | Country | Date |
|---|---|---|
| 307,340 | Germany | June 14, 1916 |
| 510,674 | France | Dec. 9, 1920 |